United States Patent
Uruma et al.

(10) Patent No.: US 12,246,842 B2
(45) Date of Patent: Mar. 11, 2025

(54) MOTOR-INTEGRATED FLUID MACHINE AND VERTICAL TAKE-OFF AND LANDING AIRCRAFT

(71) Applicant: MITSUBISHI HEAVY INDUSTRIES, LTD., Tokyo (JP)

(72) Inventors: Osamu Uruma, Tokyo (JP); Toshihide Yajima, Tokyo (JP); Naoaki Fujiwara, Tokyo (JP); Takeshi Katayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 633 days.

(21) Appl. No.: 17/299,098

(22) PCT Filed: Oct. 30, 2019

(86) PCT No.: PCT/JP2019/042502
§ 371 (c)(1),
(2) Date: Jun. 2, 2021

(87) PCT Pub. No.: WO2020/121671
PCT Pub. Date: Jun. 18, 2020

(65) Prior Publication Data
US 2022/0063820 A1 Mar. 3, 2022

(30) Foreign Application Priority Data
Dec. 13, 2018 (JP) .................... 2018-233716

(51) Int. Cl.
*B64D 27/24* (2024.01)
*B64C 11/00* (2006.01)
(Continued)

(52) U.S. Cl.
CPC ............ *B64D 27/24* (2013.01); *B64C 11/001* (2013.01); *B64C 11/10* (2013.01); *B64U 30/29* (2023.01);
(Continued)

(58) Field of Classification Search
CPC ....... B64C 11/001; B64C 27/20; B64C 29/00; B64U 30/26; B64U 50/14; B63H 2023/005; B63H 1/16; B60L 2200/10
See application file for complete search history.

(56) References Cited

U.S. PATENT DOCUMENTS 3,708,251 A 1/1973 Pierro
4,459,087 A 7/1984 Barge
(Continued)

FOREIGN PATENT DOCUMENTS

DE 10 2011 054 849 1/2013
EP 3 599 159 1/2020
(Continued)

OTHER PUBLICATIONS

Extended European Search Report issued Dec. 1, 2021 in corresponding European Patent Application No. 19896687.1.
(Continued)

*Primary Examiner* — Courtney D Heinle
*Assistant Examiner* — Ryan C Clark
(74) *Attorney, Agent, or Firm* — WENDEROTH, LIND & PONACK, L.L.P.

(57) ABSTRACT

A motor-integrated fan 1 including one or more motors integrated therein comprises: a shaft part 11 which serves as a supporting system disposed at the center of a rotational axis; a rotation part 12 which is a rotating system rotating about the shaft part 11; a duct 13 which serves as a supporting system provided on the outer periphery of the shaft part 11; and a motor 14 which rotates the rotation part
(Continued)

12, wherein the rotation part 12 comprises: a plurality of blades 32 rotatably supported at least on the shaft part 11 and rotating thereabout, the blades 32 being arranged in a circumferential direction of the rotational axis I; and a rotation support ring 33 connected on one side of each of the blades 32 in a radial direction of the rotational axis, the rotation support ring 33 supporting the plurality of blades 32.

9 Claims, 6 Drawing Sheets

(51) Int. Cl.
    B64C 11/10      (2006.01)
    B64U 30/29      (2023.01)
    B64U 50/19      (2023.01)
    H02K 7/14       (2006.01)
    H02K 21/24      (2006.01)
(52) U.S. Cl.
    CPC .............. B64U 50/19 (2023.01); H02K 7/14 (2013.01); H02K 21/24 (2013.01)

(56) References Cited

U.S. PATENT DOCUMENTS

| | | | |
|---|---|---|---|
| 4,953,811 A | 9/1990 | Smith | |
| 5,185,545 A * | 2/1993 | Veronesi | B63H 21/17 310/90 |
| 5,220,231 A * | 6/1993 | Veronesi | H02K 5/225 310/90 |
| 5,634,611 A | 6/1997 | Marze et al. | |
| 6,390,418 B1 * | 5/2002 | McCormick | B64C 23/00 244/1 N |
| 8,668,449 B2 * | 3/2014 | Orosa | F01D 25/305 415/914 |
| 9,174,728 B2 | 11/2015 | Altmikus et al. | |
| 10,473,107 B1 * | 11/2019 | Newton | B64U 30/26 |
| 2002/0047071 A1 * | 4/2002 | Illingworth | F15D 1/00 244/199.1 |
| 2006/0016929 A1 * | 1/2006 | Mohr | B64C 29/0025 310/112 |
| 2010/0021288 A1 * | 1/2010 | Collette | B64C 39/024 415/176 |
| 2011/0272520 A1 | 11/2011 | Ruan et al. | |
| 2016/0152327 A1 * | 6/2016 | Bertels | B64U 30/26 415/121.3 |
| 2017/0104385 A1 * | 4/2017 | Salamon | B63H 3/06 |
| 2018/0346108 A1 | 12/2018 | Sheng et al. | |

FOREIGN PATENT DOCUMENTS

| | | |
|---|---|---|
| EP | 3 878 737 | 9/2021 |
| EP | 3 889 035 | 10/2021 |
| JP | 2001-97288 | 4/2001 |
| JP | 2013-139247 | 7/2013 |
| WO | 95/13964 | 5/1995 |
| WO | 2015-005776 | 1/2015 |

OTHER PUBLICATIONS

International Search Report and Written Opinion issued Jan. 21, 2020 in International (PCT) Patent Application No. PCT/JP2019/042502, with English Translation.

* cited by examiner

MOTOR-INTEGRATED FLUID MACHINE AND VERTICAL TAKE-OFF AND LANDING AIRCRAFT

TECHNICAL FIELD

The present invention relates to a motor-integrated fluid machine and a vertical take-off and landing aircraft.

BACKGROUND ART

An electric tail rotor of a helicopter is known in the related art (for example, see Japanese Unexamined Patent Application Publication No. 2013-139247, hereinafter JP '247. The tail rotor includes a housing and two synchronous motors integrated into the housing. The two synchronous motors include two stators that are disposed on the inner periphery of an annular body of the housing, two rotating components that are disposed on the inner peripheral side of the two stators, and blades that are provided between the two rotating components. The blades are supported at the center by a hub. Further, the blades are rotated by a bevel gear provided between the two rotating components. A plurality of permanent magnets are provided on the outer periphery of each rotating component, and a plurality of poles are provided in each stator so as to correspond to the plurality of permanent magnets. The two rotating components are rotated and rotate the bevel gear, so that the two synchronous motors rotate the blades.

However, since the tail rotor disclosed in JP '247 includes the bevel gear, the structure of the tail rotor is complicated and it is difficult to make the tail rotor compact. Further, since the hub is not supported in a case where the tail rotor disclosed in JP '247 is rotated without a gear for the simplification of the structure, a bearing needs to be provided in an outer peripheral part. However, in a case where the circumferential speed of each blade at the outer peripheral part is high, it is difficult to apply a mechanical bearing to the outer peripheral part.

Accordingly, an object of the present invention is to provide a motor-integrated fluid machine and a vertical take-off and landing aircraft which can appropriately rotate blades and of which the structure can be simplified.

SUMMARY OF THE INVENTION

A motor-integrated fluid machine according to the present invention is a motor-integrated fluid machine in which one or more motors are integrally provided. The motor-integrated fluid machine includes a shaft part that is provided at a center of a rotational axis and serves as a supporting system, a rotation part that is rotated about the shaft part and serves as a rotating system, an outer peripheral part that is provided on an outer periphery of the shaft part and serves as the supporting system, and a motor that rotates the rotation part. The rotation part is rotatably supported by at least the shaft part and is rotated, and includes a plurality of blades that are arranged in a circumferential direction of the rotational axis and a rotation support member that is connected to one side of each of the plurality of blades in a radial direction of the rotational axis and supports the plurality of blades.

According to this configuration, the rotation part can be rotated while being rotatably supported by at least the shaft part. For this reason, since the rotation part can be simply adapted to include the plurality of blades and the rotation support member without a gear even in a case where a circumferential speed is high, the rotation part can have compact configuration.

Further, it is preferable that the motor is an outer periphery drive motor supplying power to the rotation part from the outer peripheral part to rotate the rotation part, the rotation support member of the rotation part is a rotation support ring formed in an annular shape centered on the rotational axis and connected to an outer peripheral side of the plurality of blades in the radial direction of the rotational axis, and the motor includes a rotor-side magnet provided on an outer peripheral side of the rotation support ring in the radial direction and a stator-side magnet provided on an inner peripheral side of the outer peripheral part and is provided to face the rotor-side magnet.

According to this configuration, the rotation part can be rotated by the motor of which the outer periphery is driven. Further, since the motor can be provided on the outer peripheral side of the rotation support ring, the configuration of the shaft part can be simplified. The rotor-side magnet and the stator-side magnet may face each other in the axial direction of the rotational axis (axial arrangement) or may face each other in the radial direction of the rotational axis (radial arrangement), and are not particularly limited.

Furthermore, it is preferable that the motor is an inner periphery drive motor supplying power to the rotation part from the shaft part to rotate the rotation part, the rotation support member of the rotation part is a rotation support ring formed in an annular shape centered on the rotational axis and connected to an inner peripheral side of the plurality of blades in the radial direction of the rotational axis, and the motor includes a rotor-side magnet provided on an inner peripheral side of the rotation support ring in the radial direction and a stator-side magnet provided on an outer peripheral side of the shaft part and provided to face the rotor-side magnet.

According to this configuration, the rotation part can be rotated by the motor of which the inner periphery is driven. Further, since the motor can be provided on the inner peripheral side of the rotation support ring, the configuration of the outer peripheral part can be simplified. The rotor-side magnet and the stator-side magnet may face each other in the axial direction of the rotational axis (axial arrangement) or may face each other in the radial direction of the rotational axis (radial arrangement), and are not particularly limited.

Moreover, it is preferable that the rotor-side magnet and the stator-side magnet are provided to face each other in an axial direction of the rotational axis.

According to this configuration, the rotor-side magnet and the stator-side magnet can be arranged over a plane orthogonal to the axial direction. For this reason, since the installation area of the rotor-side magnet and the stator-side magnet can be increased, the rotation output of the motor can be increased.

Further, it is preferable that the rotor-side magnet and the stator-side magnet are provided to face each other in the radial direction of the rotational axis.

According to this configuration, since the rotor-side magnet and the stator-side magnet are disposed to face each other in the radial direction, the rotation part can be suitably rotated in the circumferential direction by the motor.

Furthermore, it is preferable that the rotation part is provided on an inflow side of the shaft part into which fluid flows in an axial direction of the rotational axis.

According to this configuration, since the rotation part can be provided on the inflow side, the length of a flow channel for fluid flowing into the rotation part can be reduced and the length of a flow channel for fluid flowing out of the rotation part can be increased. For this reason, in a case where a thrust is generated by fluid, fluid is easily sucked and fluid can be appropriately blown out. Accordingly, a high thrust can be generated.

Moreover, it is preferable that the outer peripheral part is a duct formed in an annular shape and generating a thrust by the rotation of the rotation part, the duct includes an upstream portion provided on an inflow side into which fluid flows, a downstream portion provided on an outflow side out of which the fluid flows, and a midstream portion provided between the upstream portion and the downstream portion, at least an inner peripheral surface of the upstream portion is formed of a surface having a predetermined radius of curvature in a cross section taken along a plane orthogonal to the circumferential direction of the rotational axis, an inner peripheral surface of the midstream portion is formed of a surface including a linear portion in the cross section, and an inner peripheral surface of the downstream portion is formed of a surface spreading from the inflow side toward a downstream side in the cross section.

According to this configuration, since fluid can be caused to flow along the inner peripheral surface of the duct, a thrust can be appropriately generated by the duct.

Further, it is preferable that the motor-integrated fluid machine further includes an aerodynamic device provided on an inner peripheral surface of the duct on an outflow side of the rotation part and suppressing separation of fluid flowing along the inner peripheral surface and the aerodynamic device is provided on a boundary side of at least the midstream portion at a boundary between the midstream portion and the downstream portion.

According to this configuration, since the separation of fluid on the inner peripheral surface of the duct can be suppressed by the aerodynamic device, a reduction in thrust can be suppressed.

Furthermore, it is preferable that the motor-integrated fluid machine further includes a control unit controlling the aerodynamic device and the control unit causes the aerodynamic device to operate until the rotation part reaches a predetermined rotation speed.

According to this configuration, the flow of fluid along the inner peripheral surface is slowed until the rotation part reaches a predetermined rotation speed, but the separation of fluid from the inner peripheral surface can be suppressed since fluid can flow along the inner peripheral surface by the operation of the aerodynamic device.

Moreover, it is preferable that, in a case where an inflow-side plane of the rotation part orthogonal to an axial direction of the rotational axis is defined as a plane of rotation, the plane of rotation is positioned at the midstream portion in the axial direction.

According to this configuration, since the rotation part can be rotated at the midstream portion, fluid sucked at the upstream portion can be blown out at the downstream portion. Accordingly, a thrust can be appropriately generated.

Further, it is preferable that the motor-integrated fluid machine further includes a rolling bearing provided in at least one of a space between the rotation part and the outer peripheral part and a space between the rotation part and the shaft part.

According to this configuration, the rotation part can be smoothly rotated in a state where at least one of the rotation part and the outer peripheral part and the rotation part and the shaft part are connected to each other.

Furthermore, it is preferable that the motor-integrated fluid machine further includes a magnetic bearing provided in at least one of a space between the rotation part and the outer peripheral part and a space between the rotation part and the shaft part.

According to this configuration, the rotation part can be smoothly rotated in a state where at least one of the rotation part and the outer peripheral part and the rotation part and the shaft part are not connected to each other.

Moreover, it is preferable that the motor-integrated fluid machine further includes a rectification plate provided on an outflow side of the rotation part, connecting the shaft part to the outer peripheral part, and rectifying a flow of fluid flowing from the rotation part.

According to this configuration, fluid from the rotation part can be rectified and flow out.

A vertical take-off and landing aircraft according to the present invention includes the motor-integrated fluid machine and an airframe moved by a thrust generated from the motor-integrated fluid machine.

According to this configuration, since the compact motor-integrated fluid machine is mounted, weight can be reduced and an appropriate thrust can be generated by the motor-integrated fluid machine.

DESCRIPTION OF EMBODIMENTS

Embodiments of the present invention will be described in detail below with reference to the drawings. The present invention is not limited by the embodiments. Further, components of the following embodiments include components that can be easily substituted by those skilled in the art or substantially the same components. Furthermore, components described below can be appropriately combined. Moreover, in a case where there are a plurality of embodiments, the respective embodiments can also be combined.

First Embodiment

A motor-integrated fluid machine according to a first embodiment is an axial fluid machine. The motor-integrated fluid machine is a motor-integrated fan 1 (hereinafter, referred to as a fan 1) that generates a thrust by taking in air from a suction port and blowing out air from a blow-out port. In the first embodiment, the present invention will be applied to the motor-integrated fan 1 as the motor-integrated fluid machine and will be described below. However, the present invention is not particularly limited to this configuration.

The motor-integrated fluid machine may be applied as, for example, a motor-integrated propeller, such as a propeller which generates a thrust by taking in liquid, such as water or sea water, from a suction port and jetting the liquid from a blow-out port.

The motor-integrated fan 1 is provided in, for example, a vertical take-off and landing aircraft, such as a helicopter or a drone. The motor-integrated fan 1 provided in the vertical take-off and landing aircraft generates a thrust for raising an airframe or generates a thrust for controlling the attitude of an airframe. The motor-integrated fan 1 may be applied to, for example, an air cushion vehicle, such as a hovercraft. Further, in a case where the motor-integrated fluid machine is applied as a motor-integrated propeller, the motor-integrated fluid machine may be applied to a ship.

Figure 1:
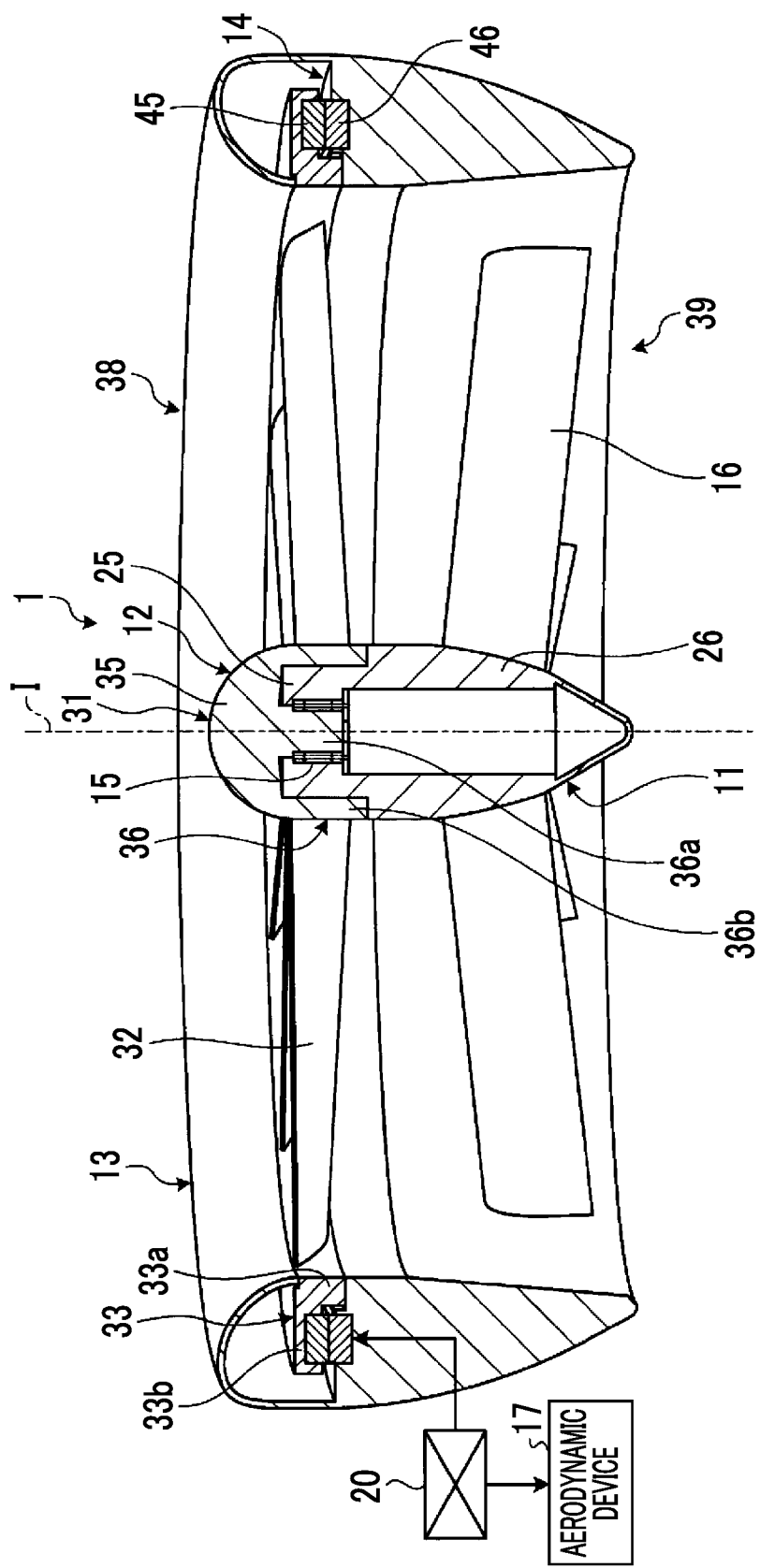
FIG. 1 is a cross-sectional view of a motor-integrated fan according to a first embodiment.
Figure 2:
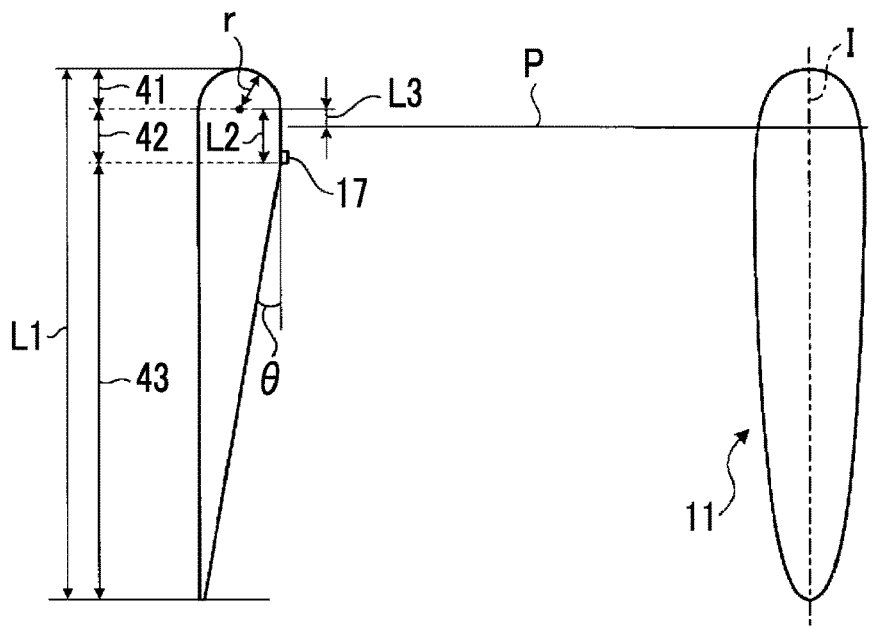
FIG. 2 is a diagram illustrating a duct of the motor-integrated fan according to the first embodiment.

The motor-integrated fan 1 will be described with reference to FIGS. 1 and 2. FIG. 1 is a cross-sectional view of the motor-integrated fan according to the first embodiment. FIG. 2 is a diagram illustrating a duct of the motor-integrated fan according to the first embodiment. The motor-integrated fan 1 is called a duct-type propeller or a ducted fan. For example, the motor-integrated fan 1 is used in a horizontal state where the axial direction of the motor-integrated fan 1 is a vertical direction, and takes in air from the upper side in the vertical direction and blows out air to the lower side in the vertical direction. The motor-integrated fan 1 may be used in a vertical state where the axial direction of the motor-integrated fan 1 is a horizontal direction.

The motor-integrated fan 1 is a fan in which one motor is integrally provided, and includes a shaft part 11, a rotation part 12, an outer peripheral part 13, a motor 14, a rolling bearing 15, rectification plates 16, aerodynamic devices 17, and a control unit 20.

The shaft part 11 is provided at the center of a rotational axis I and serves as a supporting system (fixed side). The axial direction of the rotational axis I is a vertical direction in FIG. 1, and is a direction along the vertical direction. For this reason, the flow direction of air is a direction along the axial direction of the rotational axis I. The shaft part 11 includes a shaft-side fitting portion 25 that is a portion provided on the upstream side of the shaft part 11 in the axial direction of the rotational axis I, and a shaft body 26 that is a portion provided on the downstream side of the shaft-side fitting portion 25.

A hub 31 of the rotation part 12 to be described later is fitted to the shaft-side fitting portion 25. The shaft-side fitting portion 25 is formed in a cylindrical shape and is provided to protrude from the upstream end face of the shaft body 26 in the axial direction. A columnar space is formed in the shaft-side fitting portion 25 on the center side of the rotational axis I. A part of the hub 31 of the rotation part 12 is inserted into this space. Further, the outer peripheral side of the shaft-side fitting portion 25 is surrounded by a part of the hub 31 of the rotation part 12.

The shaft body 26 is formed in a substantially conical shape that is tapered toward the downstream side from the upstream side in the axial direction. For this reason, the outer peripheral surface of the shaft body 26 is formed of a surface that goes from the outside to the inside in a radial direction toward the downstream side from the upstream side in the axial direction. An internal space in which equipment can be installed is formed in the shaft body 26. Examples of the equipment include a control device, a camera, and the like. Further, radially inner end portions of the rectification plates 16 to be described later are connected to the outer peripheral surface of the shaft body 26.

The rotation part 12 is rotated about the shaft part 11 and serves as a rotating system (rotating side). The rotation part 12 is provided on the inflow side of the shaft part 11 into which air flows in the axial direction of the rotational axis I. The rotation part 12 includes a hub 31, a plurality of blades 32, and a rotation support ring 33.

The hub 31 is provided on the upstream side of the shaft part 11 in the axial direction, and is rotatably fitted to the shaft-side fitting portion 25. The hub 31 includes a hub body 35 that is a portion provided on the upstream side in the axial direction and a hub-side fitting portion 36 that is a portion provided on the downstream side of the hub body 35. An upstream end face of the hub body is a hemispherical surface that has a predetermined radius of curvature. The hub-side fitting portion 36 is formed in a shape complementary to the shaft-side fitting portion 25. The hub-side fitting portion 36 includes a central shaft 36a that is provided at the center of the rotational axis, and a cylindrical portion 36b that is formed on the outer peripheral side of the central shaft 36a and has a cylindrical shape. The central shaft 36a is inserted into the space that is formed in the shaft-side fitting portion 25 at the center of the rotational axis. The cylindrical portion 36b is provided to protrude from the downstream end face of the hub body 35 in the axial direction. The cylindrical portion 36b is disposed so as to surround the outer periphery of the shaft-side fitting portion 25. In this case, the rolling bearing 15 is provided between the inner peripheral surface of the shaft-side fitting portion 25 and the outer peripheral surface of the central shaft 36a of the hub 31.

Further, a surface that reaches the outer peripheral surface of the shaft body 26 from the end face of the hub body 35 via the outer peripheral surface of the cylindrical portion 36b is formed of a smooth surface without a stepped portion.

Here, the shaft part 11 and the hub 31 are adapted so that a recessed portion and a protruding portion thereof are fitted to each other as described above. That is, the shaft-side fitting portion 25 of the shaft part 11 formed in the cylindrical shape is formed as a recessed portion, the central shaft 36a of the hub 31 is formed as a protruding portion, and the central shaft 36a is inserted into the shaft-side fitting portion 25, so that the shaft part 11 and the hub 31 are adapted to be fitted to each other. However, the shaft part 11 and the hub 31 are not limited to this configuration, and configuration where the recessed portion and the protruding portion are fitted to each other may be inverted. That is, the shaft-side fitting portion 25 of the shaft part 11 may be formed as a protruding portion, a recessed portion may be provided in the hub 31, and the shaft-side fitting portion 25 may be inserted into the recessed portion of the hub 31, so that the shaft part 11 and the hub 31 may be adapted to be fitted to each other. In this case, the rolling bearing 15 is provided between the outer peripheral surface of the shaft-side fitting portion 25 and the inner peripheral surface of the recessed portion of the hub 31. Configuration where the recessed portion and the protruding portion are fitted to each other will be described in detail in a third embodiment to be described later.

The plurality of blades 32 are provided to extend outward from the hub 31 in the radial direction, and are arranged at predetermined intervals in a circumferential direction. Each blade 32 is formed in the shape of an airfoil. A plane, which is formed by inflow-side end portions of the plurality of blades 32 orthogonal to the axial direction of the rotational axis I during the rotation of the plurality of blades 32, is a plane P of rotation. For example, the plurality of blades 32 may be made of a metallic material or may be made of a composite material, and are not particularly limited.

The rotation support ring 33 is formed in an annular shape centered on the rotational axis I. The rotation support ring 33 is connected to the outer peripheral side of the plurality of blades 32 in the radial direction of the rotational axis I. The rotation support ring 33 includes an inner ring portion 33a that is a portion forming a part of the inner peripheral surface of the outer peripheral part 13 to be described later, and a flange portion 33b that is a portion provided to protrude on the outside of the inner ring portion 33a in the radial direction. The inner peripheral surface of the inner ring portion 33a provided on the inside in the radial direction forms a part of the inner peripheral surface of the outer peripheral part 13. Further, the radially outer end portion of each blade 32 is joined to the inner peripheral surface of the inner ring portion 33a by welding or the like, or is fixed to the inner peripheral surface of the inner ring portion 33a by a bolt, a rivet, or the like. The flange portion 33b is provided on the upstream side of the inner ring portion 33a in the axial direction. The flange portion 33b holds permanent magnets 45 of the motor 14 to be described later. The flange portion 33b holds the permanent magnets 45 so that the permanent magnets 45 face the downstream side in the axial direction.

The hub 31, the plurality of blades 32, and the rotation support ring 33 of the rotation part 12 are integrally joined to each other, and the rotation part 12 is rotated about the hub 31. At this time, in a case where the rotation part 12 is to be made of a composite material, a part or all of the rotation part 12 may be integrally molded. For example, in the rotation part 12, the plurality of blades 32 and the rotation support ring 33 may be integrally molded using a composite material or the hub 31, the plurality of blades 32, and the rotation support ring 33 may be integrally molded using a composite material.

The outer peripheral part 13 is provided outside the shaft part 11 in the radial direction and serves as the supporting system (fixed side). The outer peripheral part 13 is a duct that is formed in an annular shape and generates a thrust by the rotation of the rotation part 12. The upstream opening of the outer peripheral part 13 (hereinafter, referred to as a duct 13) in the axial direction of the rotational axis I serves as a suction port 38 and the downstream opening thereof serves as a blow-out port 39.

An annular internal space, which houses the flange portion 33b of the rotation support ring 33 of the rotation part 12 and coils 46 of the motor 14 to be described later, is formed in the duct 13. The duct 13 holds the coils 46, which are provided at positions facing the permanent magnets 45 held by the rotation part 12, therein.

As shown in FIG. 2, the duct 13 includes an upstream portion 41 on an inflow side into which air flows, a downstream portion 43 on an outflow side out of which air flows, and a midstream portion 42 between the upstream portion 41 and the downstream portion 43. That is, the duct 13 is partitioned into three portions formed of the upstream portion 41, the midstream portion 42, and the downstream portion 43 in the axial direction.

Each of the outer peripheral surface and the inner peripheral surface of the duct 13 at the upstream portion 41 is formed of a curved surface having a predetermined radius r of curvature in a cross section taken along a plane orthogonal to the circumferential direction of the rotational axis I. At least the inner peripheral surface of the upstream portion 41 may be formed of the curved surface having the predetermined radius r of curvature. Further, each of the outer peripheral surface and the inner peripheral surface of the duct 13 at the midstream portion 42 is formed of a surface including a linear portion in the cross section. At least the inner peripheral surface of the midstream portion 42 may be formed of a surface including a linear portion. The surface including the linear portion is a surface along the axial direction of the rotational axis I. Furthermore, a part of the surface including the linear portion forms the inner peripheral surface of the inner ring portion 33a of the rotation support ring 33 of the rotation part 12. That is, the rotation part 12 is positioned at the midstream portion 42 of the duct 13 in the axial direction of the rotational axis I. Moreover, the inner peripheral surface of the duct 13 at the downstream portion 43 is formed of a surface radially spreading (tapered) from the inflow side toward the downstream side.

Here, the diameter of the rotation part 12 at the plane P of rotation, that is, the diameter of the inner peripheral surface of the inner ring portion 33a of the rotation support ring 33 is denoted by D. The diameter D of the rotation part 12 is larger than the length L1 of the motor-integrated fan 1 in the axial direction of the rotational axis I. In other words, the length L1 of the motor-integrated fan 1 in the axial direction of the rotational axis I is smaller than the diameter D of the rotation part 12, and is in the range of "$0.2D \leq L1 \leq 0.8D$", and specifically, in the range of "$0.4D \leq L1 \leq 0.5D$". For this reason, the motor-integrated fan 1 is a flat fan of which the length L1 is equal to or smaller than a half of the diameter D.

Further, in the axial direction of the rotational axis I, the length of the downstream portion 43 is longer than each of the length of the upstream portion 41 and the length of the midstream portion 42. The predetermined radius r of curvature of the upstream portion 41 is in the range of, for example, "$0.02D \leq L1 \leq 0.10D$", and specifically, in the range of "$0.03D \leq r \leq 0.09D$". As long as the radius r of curvature is in the above-mentioned numerical range, the radius r of curvature of the outer peripheral surface of the upstream portion 41 may be different from that of the inner peripheral surface of the upstream portion 41. The plane P of rotation of the rotation part 12 is positioned on the upstream side of the midstream portion 42 in the axial direction of the rotational axis I. Specifically, in a case where the length L2 of the midstream portion 42 is, for example, 0.1D, a length L3 between the upstream boundary of the midstream portion 42 and the plane P of rotation is, for example, 0.01D.

Further, the spread (taper) of the inner peripheral surface of the downstream portion 43 will be described. In a case where an angle between the inner peripheral surface of the downstream portion 43 and a direction along the inner peripheral surface of the midstream portion 42 (the axial direction of the rotational axis I) in a cross section taken along a plane orthogonal to the circumferential direction of the rotational axis I is defined as a diffuser angle $\theta$, the diffuser angle $\theta$ is in the range of "$0° \leq \theta \leq 30°$".

Since the duct 13 is formed in the above-mentioned shape, the duct 13 sucks air from the suction port 38 and blows out the sucked air from the blow-out port 39 by the rotation of the rotation part 12 to generate a thrust.

The motor 14 is an outer periphery drive motor that supplies power to the rotation part 12 from the duct 13 side to rotate the rotation part 12. The motor 14 includes a rotor-side magnet that is provided on the rotation part 12 side and a stator-side magnet that is provided on the duct 13 side. In the first embodiment, the rotor-side magnet is the permanent magnets 45 and the stator-side magnet is the coils (electromagnets) 46. Configuration related to the handling of wiring and the like around the coils 46 is simplified since the supporting system is provided with the coils 46 in the first embodiment. However, the present invention is not particularly limited to this configuration. The coils may be used as the rotor-side magnet and the permanent magnets 45 may be used as the stator-side magnet.

The permanent magnets 45 are provided to be held by the flange portion 33*b* of the rotation support ring 33, and are arranged in an annular shape in the circumferential direction. Further, the permanent magnets 45 are adapted so that positive poles and negative poles are alternated at predetermined intervals in the circumferential direction. The permanent magnets 45 may be arranged to form a Halbach array. The permanent magnets 45 are provided at positions facing the coils 46 in the axial direction of the rotational axis I. The length of the permanent magnet 45 in the radial direction of the rotational axis I is longer than the length thereof in the axial direction of the rotational axis I.

A plurality of coils 46 are provided to be held in the duct 13, are provided to face the respective poles of the permanent magnets 45, and are arranged in the circumferential direction. The coils 46 are provided at positions facing the permanent magnets 45, which are held by the rotation part 12, in the axial direction of the rotational axis I. That is, axial arrangement where the permanent magnets 45 and the coils 46 are arranged to face each other in the axial direction of the rotational axis I is made.

The rolling bearing 15 is provided between the inner peripheral surface of the shaft-side fitting portion 25 of the shaft part 11 and the outer peripheral surface of the central shaft 36*a* of the hub 31 of the rotation part 12. The rolling bearing 15 connects the shaft part 11 to the rotation part 12 while allowing the rotation of the rotation part 12 with respect to the shaft part 11. The rolling bearing 15 is, for example, a ball bearing or the like.

The rectification plates 16 are provided to connect the shaft part 11 to the duct 13. The rectification plates 16 are provided on the downstream side of the rotation part 12 in the axial direction of the rotational axis I. That is, the rectification plates 16 are provided at the position of a downstream portion 43 of the duct 13 in the axial direction. A plurality of rectification plates 16 are arranged in the circumferential direction of the rotational axis I. Further, the rectification plates 16 are formed in a streamlined shape, such as the shape of an airfoil, rectify air flowing in from the rotation part 12, and generate a thrust. The shape of the rectification plate 16 is not limited to the shape of an airfoil and may be the shape of a flat plate.

The aerodynamic devices 17 are provided on the inner peripheral surface of the duct 13 on the downstream side of the rotation part 12. The aerodynamic devices 17 suppress the separation of air flowing along the inner peripheral surface of the duct 13. Examples of the aerodynamic device 17 include a plasma actuator, a synthetic jet, and the like. In the first embodiment, a device for giving a flow, which is toward the downstream side, to air so that the flow of air along the inner peripheral surface of the duct 13 is changed to the flow of air toward the downstream side is applied as the aerodynamic device 17. Specifically, a plasma actuator is applied as the aerodynamic device 17.

The aerodynamic devices 17 are provided along a boundary between the midstream portion 42 and the downstream portion 43 of the duct 13 in the axial direction of the rotational axis I. Specifically, the aerodynamic devices are provided on the boundary side of at least the midstream portion 42. The aerodynamic devices 17 may be provided on the inner peripheral surface of the downstream portion 43 and are appropriately provided at portions where the separation of air may occur.

The control unit 20 is connected to each part of the motor-integrated fan 1 and controls the motor-integrated fan 1 by controlling each part. The control unit 20 is connected to the coils 46. The control unit 20 controls the rotation of the rotation part 12 by controlling the magnetic fields of the coils 46. Further, the control unit 20 is connected to the aerodynamic devices 17. The control unit 20 controls the operation of the aerodynamic devices 17. Further, since a rotation speed detection sensor (not shown) is connected to the control unit 20, the control unit 20 acquires the rotation speed of the rotation part 12.

The control unit 20 controls the operation of the aerodynamic devices 17 on the basis of the rotation speed of the rotation part 12 that is detected by the rotation speed detection sensor. Specifically, the control unit 20 causes the aerodynamic devices 17 to operate until the rotation part 12 reaches a predetermined rotation speed. That is, the control unit 20 causes the aerodynamic devices to operate in a low-speed rotation range where the rotation part 12 does not yet reach the predetermined rotation speed. On the other hand, the control unit 20 stops the operation of the aerodynamic devices 17 in a rotation range where the rotation part 12 reaches a rotation speed equal to or higher than the predetermined rotation speed. Examples of the predetermined rotation speed include a normal rotation speed to be usually used, a rated rotation speed in a rated operating state, and the like.

The motor-integrated fan 1 supplies power, which is caused by the magnetic fields, to the rotation part 12 from the duct 13 side by the motor 14, so that the rotation part 12 is rotated. In a case where the rotation part 12 is rotated, the motor-integrated fan 1 sucks air from the suction port 38 and blows out air to the blow-out port 39. The air blown out of the rotation part 12 generates a thrust by flowing along the inner peripheral surface of the duct 13. In this case, the separation of air caused by the inner peripheral surface of the duct 13 is suppressed by the aerodynamic devices 17 and the flow of air is rectified by the rectification plates 16, so that a thrust is generated by even the rectification plates 16.

According to the first embodiment, as described above, the rotation part 12 can be rotated while being rotatably supported by at least the shaft part 11. For this reason, since the movement of the rotation part 12 in the axial direction of the rotational axis I caused by the influence of vibration or the like generated during the rotation of the rotation part 12 can be suppressed, the rotation part 12 can be suitably rotated. Further, since the rotation part 12 can be simply adapted to include the plurality of blades 32 and the rotation support ring 33, the rotation part 12 can have compact configuration.

Furthermore, according to the first embodiment, the rotation part 12 can be rotated by the motor 14 of which the outer periphery is driven. Moreover, since the motor 14 can be provided on the outer peripheral side of the rotation support ring 33, the configuration of the shaft part 11 can be simplified.

Further, according to the first embodiment, the permanent magnets 45 and the coils 46 can be arranged over a plane orthogonal to the axial direction of the rotational axis I. For this reason, since the installation area of the permanent magnets 45 and the coils 46 can be increased, the rotation output of the motor 14 can be increased.

Furthermore, according to the first embodiment, since the rotation part 12 can be disposed on the upstream side of the shaft part 11, the length of a flow channel for air flowing into the rotation part 12 can be reduced and the length of a flow channel for air flowing out of the rotation part 12 can be increased. For this reason, in a case where a thrust is generated by air, air is easily sucked since the flow channel for air flowing into the rotation part 12 is short and air can be appropriately blown out since the flow channel for air flowing out of the rotation part 12 is long. Accordingly, a thrust can be made high.

Moreover, according to the first embodiment, since air can be caused to flow along the inner peripheral surface of the duct 13, a thrust can be appropriately generated by the duct 13.

Further, according to the first embodiment, since the separation of air on the inner peripheral surface of the duct 13 can be suppressed by the aerodynamic devices 17, a reduction in thrust can be suppressed.

Furthermore, according to the first embodiment, the flow of air along the inner peripheral surface of the duct is slowed until the rotation part 12 reaches a predetermined rotation speed, but air can flow along the inner peripheral surface of the duct 13 since the separation of air from the inner peripheral surface can be suppressed by the operation of the aerodynamic devices 17.

Moreover, according to the first embodiment, the plane P of rotation is positioned on the upstream side of the midstream portion 42, so that the rotation part 12 can be rotated at the midstream portion 42. For this reason, since air sucked at the upstream portion 41 can be blown out at the downstream portion 43, a thrust can be appropriately generated.

Further, according to the first embodiment, since the rolling bearing 15 is provided, the rotation part 12 and the shaft part 11 are rotatably connected to each other. Accordingly, the rotation part 12 can be smoothly rotated while the movement of the rotation part 12 in the axial direction is restricted.

Furthermore, according to the first embodiment, since the rectification plates 16 are provided, air from the rotation part 12 can be rectified and blown out of the blow-out port 39.

Moreover, according to the first embodiment, since the compact motor-integrated fan 1 is mounted on the vertical take-off and landing aircraft, weight can be reduced and an appropriate thrust can be generated by the motor-integrated fan 1.

Figure 3:
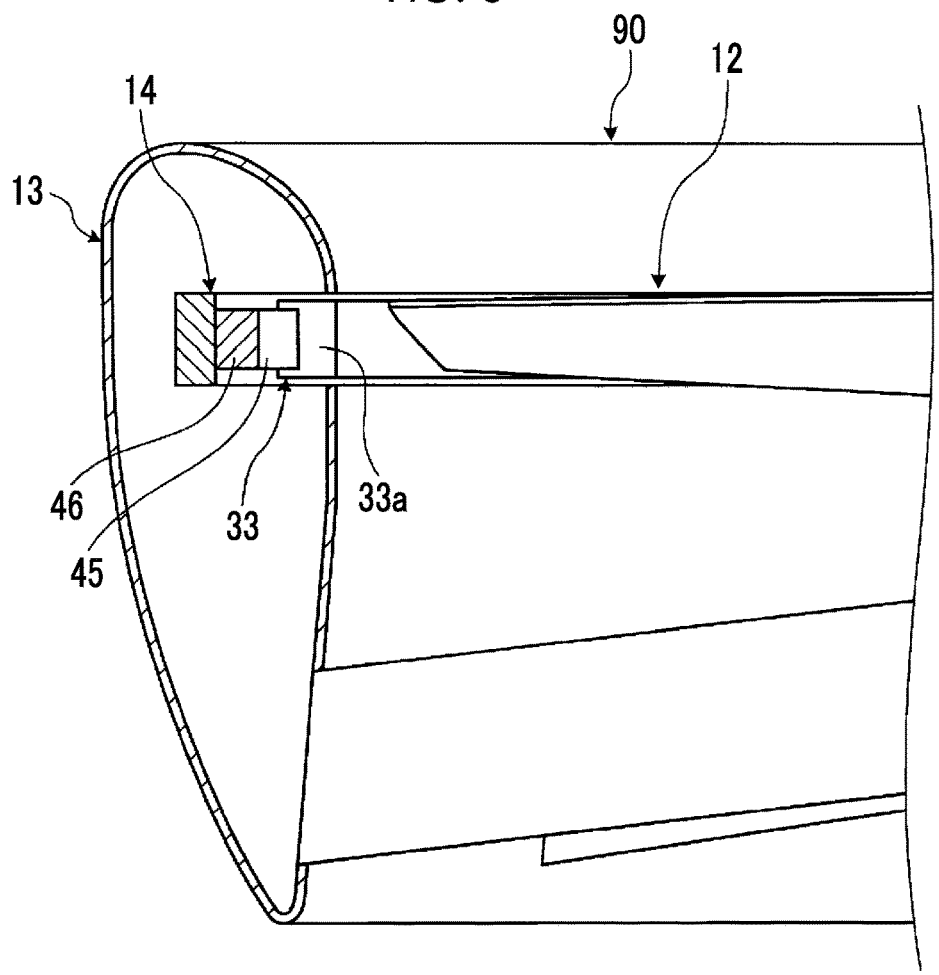
FIG. 3 is a partial cross-sectional view of a modification example of the motor-integrated fan according to the first embodiment.

Axial arrangement where the permanent magnets 45 and the coils 46 are arranged to face each other in the axial direction of the rotational axis I is made in the first embodiment, but a modification example shown in FIG. 3 may be made. FIG. 3 is a partial cross-sectional view of a modification example of the motor-integrated fan according to the first embodiment. Radial arrangement where the permanent magnets 45 and the coils 46 are arranged to face each other in the radial direction of the rotational axis I is made in the modification example shown in FIG. 3.

The rotation support ring 33 holding the permanent magnets 45 is adapted so that the flange portion 33b is omitted, and holds the permanent magnets 45 on the outer peripheral side of the inner ring portion 33a.

The permanent magnets 45 are provided to be held on the outer peripheral side of the inner ring portion 33a of the rotation support ring 33, and are arranged in an annular shape in the circumferential direction. The permanent magnets 45 are provided at positions facing the coils 46 in the radial direction of the rotational axis I.

A plurality of coils 46 are provided to be held in the duct 13, are provided to face the respective poles of the permanent magnets 45, and are arranged in the circumferential direction. The coils 46 are provided at positions facing the permanent magnets 45, which are held by the rotation part 12, in the radial direction of the rotational axis I. Radial arrangement where the permanent magnets 45 and the coils 46 are arranged to face each other in the radial direction of the rotational axis I as described above may be made.

In the modification example shown in FIG. 3, the permanent magnets 45 of the rotation support ring 33 are provided on the inside in the radial direction of the rotational axis I and the coils 46 provided in the duct 13 are provided on the outside in the radial direction of the rotational axis I. However, the present invention is not limited to this configuration. The permanent magnets 45 of the rotation support ring 33 may be provided on the outside in the radial direction of the rotational axis I and the coils 46 provided in the duct 13 may be provided on the inside in the radial direction of the rotational axis I.

Second Embodiment

Figure 4:
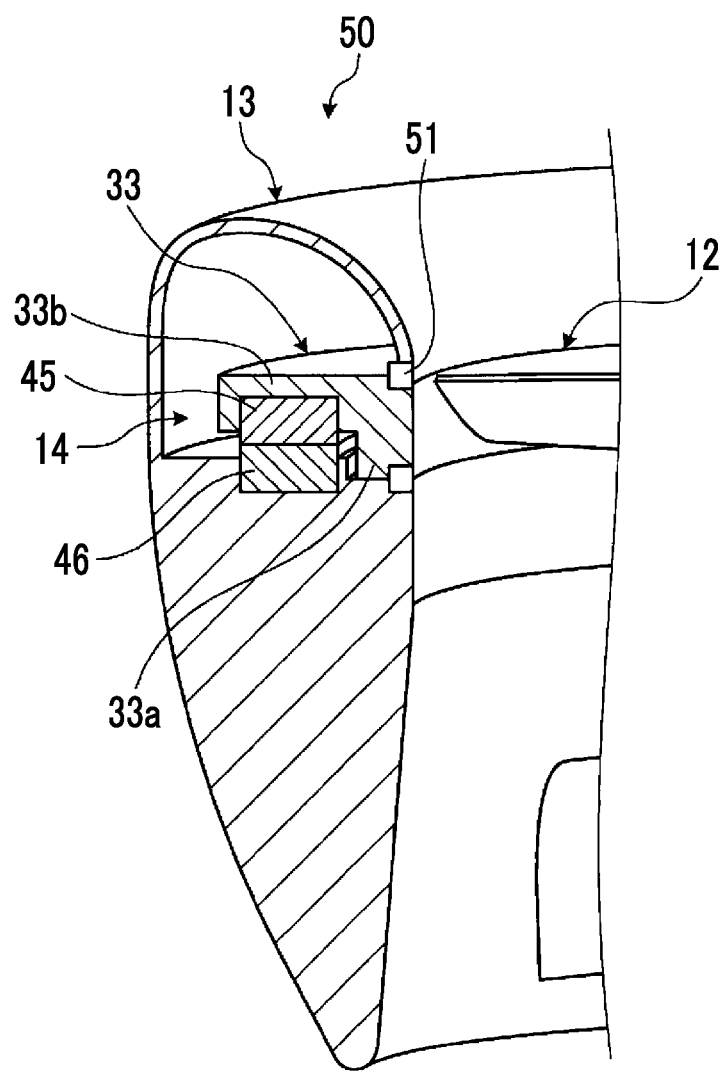
FIG. 4 is a cross-sectional view of a motor-integrated fan according to a second embodiment.

Next, a motor-integrated fan 50 according to a second embodiment will be described with reference to FIG. 4. In the second embodiment, in order to avoid repeated description, portions different from those of the first embodiment will be described and portions having the same configuration as the configuration of the first embodiment will be denoted by the same reference numerals as the reference numerals of the first embodiment and will be described. FIG. 4 is a cross-sectional view of the motor-integrated fan according to the second embodiment.

The motor-integrated fan 50 according to the second embodiment further includes rolling bearings 51 between the rotation part 12 and the duct 13 in addition to the configuration of the motor-integrated fan 1 according to the first embodiment. The rolling bearings 51 are provided on both sides of the inner ring portion 33a of the rotation support ring 33 in the axial direction of the rotational axis I. For this reason, the rotation part 12 of the motor-integrated fan 50 is rotatably supported by the shaft part 11 and the duct 13.

According to the second embodiment, since the rolling bearing 15 and the rolling bearings 51 are provided as described above, the rotation part 12 and the shaft part 11 are rotatably connected to each other and the rotation part 12 and the duct 13 are rotatably connected to each other. Accordingly, the rotation part 12 can be smoothly rotated while the movement of the rotation part 12 in the axial direction is restricted. In a case where the rolling bearings 51 are provided between the rotation part 12 and the duct 13 in the motor-integrated fan 50 according to the second embodiment, the rolling bearing 15 provided between the rotation part 12 and the shaft part 11 may be omitted.

Third Embodiment

Figure 5:
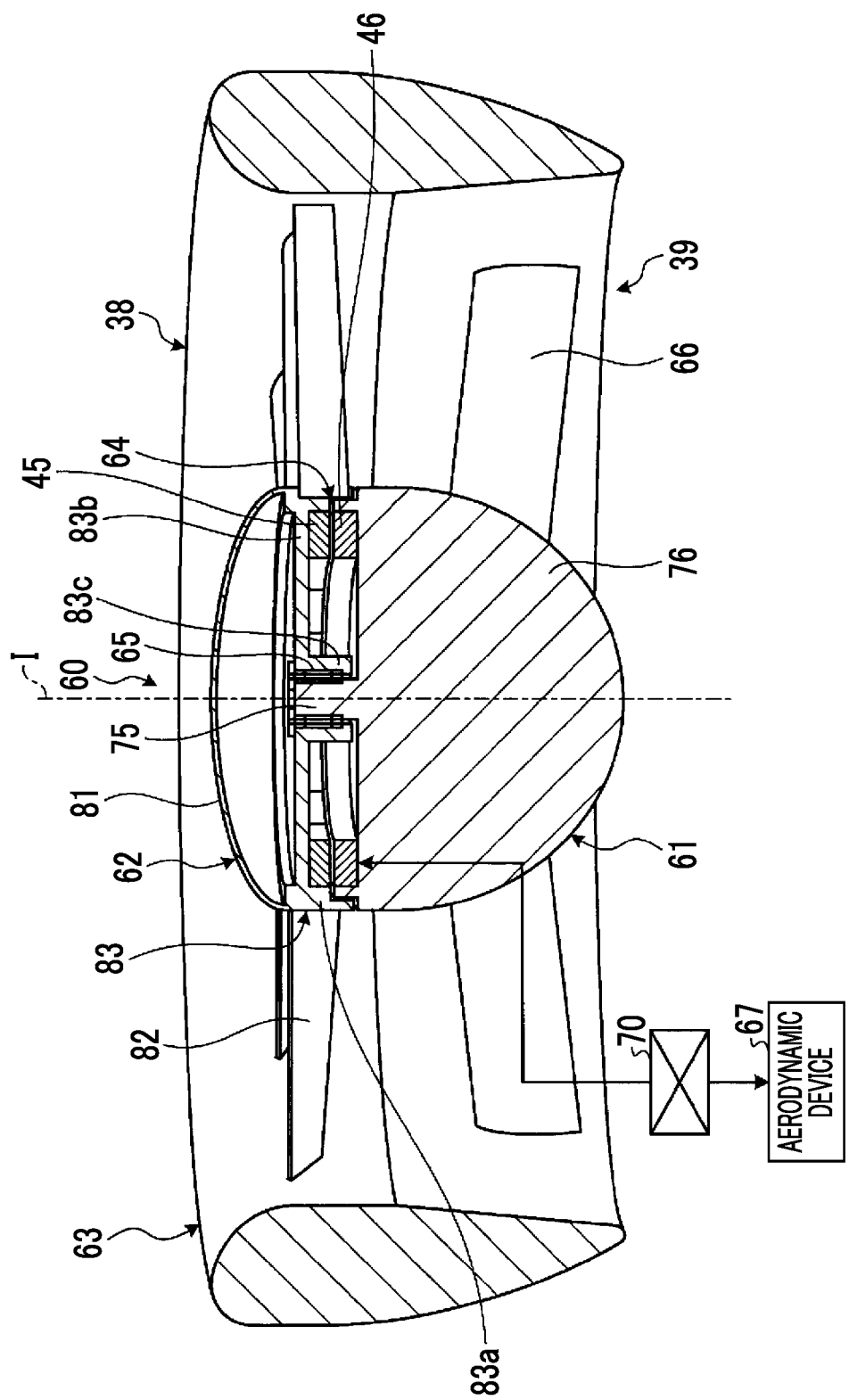
FIG. 5 is a cross-sectional view of a motor-integrated fan according to a third embodiment.

Next, a motor-integrated fan 60 according to a third embodiment will be described with reference to FIG. 5. Even in the third embodiment, in order to avoid repeated description, portions different from those of the first and second embodiments will be described and portions having the same configuration as the configuration of the first and second embodiments will be denoted by the same reference numerals as the reference numerals of the first and second embodiments and will be described. FIG. 5 is a cross-sectional view of the motor-integrated fan according to the third embodiment.

The motor 14 of the motor-integrated fan 1 according to the first embodiment is a motor of which the outer periphery is driven, but a motor 64 of the motor-integrated fan 60 according to the third embodiment is a motor of which the inner periphery is driven.

The motor-integrated fan 60 according to the third embodiment includes a shaft part 61, a rotation part 62, a duct 63, a motor 64, a rolling bearing 65, rectification plates 66, aerodynamic devices 67, and a control unit 70. Since the rolling bearing 65, the rectification plates 66, the aerodynamic devices 67, and the control unit 70 are substantially the same as those of the first embodiment, the description thereof will be omitted.

The shaft part 61 is provided at the center of a rotational axis I and serves as a supporting system (fixed side). The shaft part 61 includes a shaft-side fitting portion 75 that is a portion provided on the upstream side of the shaft part 61 in an axial direction of the rotational axis I, and a shaft body 76 that is a portion provided on the downstream side of the shaft-side fitting portion 75.

A rotation support ring 83 of the rotation part 62 to be described later is fitted to the shaft-side fitting portion 75. The shaft-side fitting portion 75 is formed in a columnar shape, and is provided on the upstream end face of the shaft body 76 so as to protrude from the center of the rotational axis I to the upstream side in the axial direction. The outer peripheral side of the shaft-side fitting portion 75 is surrounded by the rotation support ring 83 of the rotation part 62.

The shaft body 76 is formed in a hemispherical shape that is convex toward the downstream side from the upstream side in the axial direction. For this reason, the outer peripheral surface of the shaft body 76 is formed of a surface that goes from the outside to the inside in a radial direction toward the downstream side from the upstream side in the axial direction. Further, the shaft body 76 holds the coils 46 on the upstream end face thereof in the axial direction at positions on the outer peripheral side of the shaft-side fitting portion 75. An internal space in which equipment can be installed may be formed in the shaft body 76 as in the first embodiment.

The rotation part 62 is rotated about the shaft part 61 and serves as a rotating system (rotating side). The rotation part 62 is provided on the inflow side of the shaft part 61 into which air flows in the axial direction of the rotational axis I. The rotation part 62 includes a hub 81, a plurality of blades 82, and a rotation support ring 83.

The hub 81 is provided on the upstream side of the shaft part 61 in the axial direction. The upstream end face of the hub 81 is formed as a spherical surface having a predetermined radius of curvature.

The rotation support ring 83 is provided on the downstream side of the hub 81 in the axial direction and is integrated with the hub 81. The rotation support ring 83 is rotatably fitted to the shaft-side fitting portion 75. The rotation support ring 83 is formed in an annular shape centered on the rotational axis I. The rotation support ring 83 includes an outer ring portion 83a that is provided on the outside in the radial direction, a flange portion 83b that is a portion provided to protrude on the inside of the outer ring portion 83a in the radial direction, and an inner ring portion 83c that is a portion provided on the inside of the flange portion 83b in the radial direction. The outer ring portion 83a is formed in a cylindrical shape, and includes a smooth outer peripheral surface without a stepped portion with respect to the outer peripheral surface of the shaft part 61. The radially inner end portion of each blade 82 is joined to the outer peripheral surface of the outer ring portion 83a by welding or the like, or is fixed to the outer peripheral surface of the outer ring portion 83a by a bolt, a rivet, or the like. The flange portion 83b is provided on the upstream side of the outer ring portion 83a in the axial direction. The flange portion 83b holds permanent magnets 45 of the motor 64 to be described later. The flange portion 83b holds the permanent magnets 45 so that the permanent magnets 45 face the downstream side in the axial direction. The inner ring portion 83c is formed in a cylindrical shape, and is provided so as to surround the shaft-side fitting portion 75. The inner peripheral surface of the inner ring portion 83c faces the outer peripheral surface of the shaft-side fitting portion 75. In this case, the rolling bearing 65 is provided between the outer peripheral surface of the shaft-side fitting portion 75 of the shaft part 61 and the inner peripheral surface of the inner ring portion 83c of the rotation support ring 83.

Here, the shaft part 61 and the rotation support ring 83 integrated with the hub 81 are adapted so that a recessed portion and a protruding portion thereof are fitted to each other as described above. That is, the inner ring portion 83c of the rotation support ring 83 formed in the cylindrical shape is formed as a recessed portion, the shaft-side fitting portion 75 of the shaft part 61 is formed as a protruding portion, and the shaft-side fitting portion 75 is inserted into the inner ring portion 83c, so that the shaft part 61 and the rotation support ring 83 are adapted to be fitted to each other. However, the shaft part 61 and the rotation support ring 83 are not limited to this configuration, and configuration where the recessed portion and the protruding portion are fitted to each other may be inverted. That is, the shaft-side fitting portion 75 of the shaft part 61 may be formed as a recessed portion, a protruding portion may be provided on the rotation support ring 83, and the protruding portion of the rotation support ring 83 may be inserted into the shaft-side fitting portion 75 of the shaft part 61, so that the shaft part 61 and the hub 81 may be adapted to be fitted to each other. In this case, the rolling bearing 65 is provided between the inner peripheral surface of the shaft-side fitting portion 75 and the outer peripheral surface of the protruding portion of the rotation support ring 83. Configuration where the recessed portion and the protruding portion are fitted to each other is substantially the same as that described in the above-mentioned first embodiment.

The plurality of blades 82 are connected to the outer peripheral surface of the rotation support ring 83. The plurality of blades 82 are provided to extend outward from the rotation support ring 83 in the radial direction, and are arranged at predetermined intervals in a circumferential direction. Each blade 82 is formed in the shape of an airfoil. Further, the radially inner end portion of each blade 82 is connected to the outer peripheral surface of the rotation support ring 83, and the radially outer end portion thereof is a free end. For example, the plurality of blades 82 may be made of a metallic material or may be made of a composite material, and are not particularly limited.

The hub 81, the plurality of blades 82, and the rotation support ring 83 of the rotation part 62 are integrally joined to each other, and the rotation part 62 is rotated about the hub 81. At this time, in a case where the rotation part 62 is to be made of a composite material, a part or all of the rotation part 62 may be integrally molded. For example, in the rotation part 62, the plurality of blades 82 and the rotation support ring 83 may be integrally molded using a composite material or the hub 81, the plurality of blades 82, and the rotation support ring 83 may be integrally molded using a composite material.

The duct 63 is provided outside the shaft part 61 in the radial direction and serves as the supporting system (fixed side). The duct 63 is a duct that is formed in an annular shape and generates a thrust by the rotation of the rotation part 62. The upstream opening of the duct 63 in the axial direction of the rotational axis I serves as a suction port 38 and the downstream opening thereof serves as a blow-out port 39. The shape of the duct 63 is the same as that of the first embodiment.

The motor 64 is an inner periphery drive motor that supplies power to the rotation part 62 from the shaft part side to rotate the rotation part 62. The motor 64 includes a rotor-side magnet that is provided on the rotation part 62 side and a stator-side magnet that is provided on the shaft part 61 side. In the third embodiment, the rotor-side magnet is the permanent magnets 45 and the stator-side magnet is the coils (electromagnets) 46. Configuration related to the handling of wiring and the like around the coils 46 is simplified since the supporting system is provided with the coils 46 in the third embodiment. However, the present invention is not particularly limited to this configuration. The coils may be used as the rotor-side magnet and the permanent magnets 45 may be used as the stator-side magnet.

The permanent magnets 45 are provided to be held by the flange portion 83b of the rotation support ring 83, and are arranged in an annular shape in the circumferential direction. Since other configurations of the permanent magnets 45 are the same as those of the first embodiment, the description thereof will be omitted.

A plurality of coils 46 are provided to be held on the upstream end face of the shaft body 76 of the shaft part 61, are provided to face the respective poles of the permanent magnets 45, and are arranged in the circumferential direction. Since other configurations of the coils 46 are also the same as those of the first embodiment, the description thereof will be omitted.

The motor-integrated fan 60 supplies power, which is caused by the magnetic fields, to the rotation part 62 from the shaft part 61 side by the motor 64, so that the rotation part 62 is rotated. In a case where the rotation part 62 is rotated, the motor-integrated fan 60 sucks air from the suction port 38 and blows out air to the blow-out port 39. The air blown out of the rotation part 62 generates a thrust by flowing along the inner peripheral surface of the duct 63.

According to the third embodiment, as described above, the rotation part 62 can be rotated while being rotatably supported by at least the shaft part 61. For this reason, since the movement of the rotation part 62 in the axial direction of the rotational axis I caused by the influence of vibration or the like generated during the rotation of the rotation part 62 can be suppressed, the rotation part 62 can be suitably rotated. Further, since the rotation part 62 can be simply adapted to include the plurality of blades 82 and the rotation support ring 83, the rotation part 62 can have compact configuration.

Furthermore, according to the third embodiment, the rotation part 62 can be rotated by the motor 64 of which the inner periphery is driven. Moreover, since the motor 64 can be provided on the inner peripheral side of the rotation support ring 83, the configuration of the duct 63 can be simplified.

Figure 6:
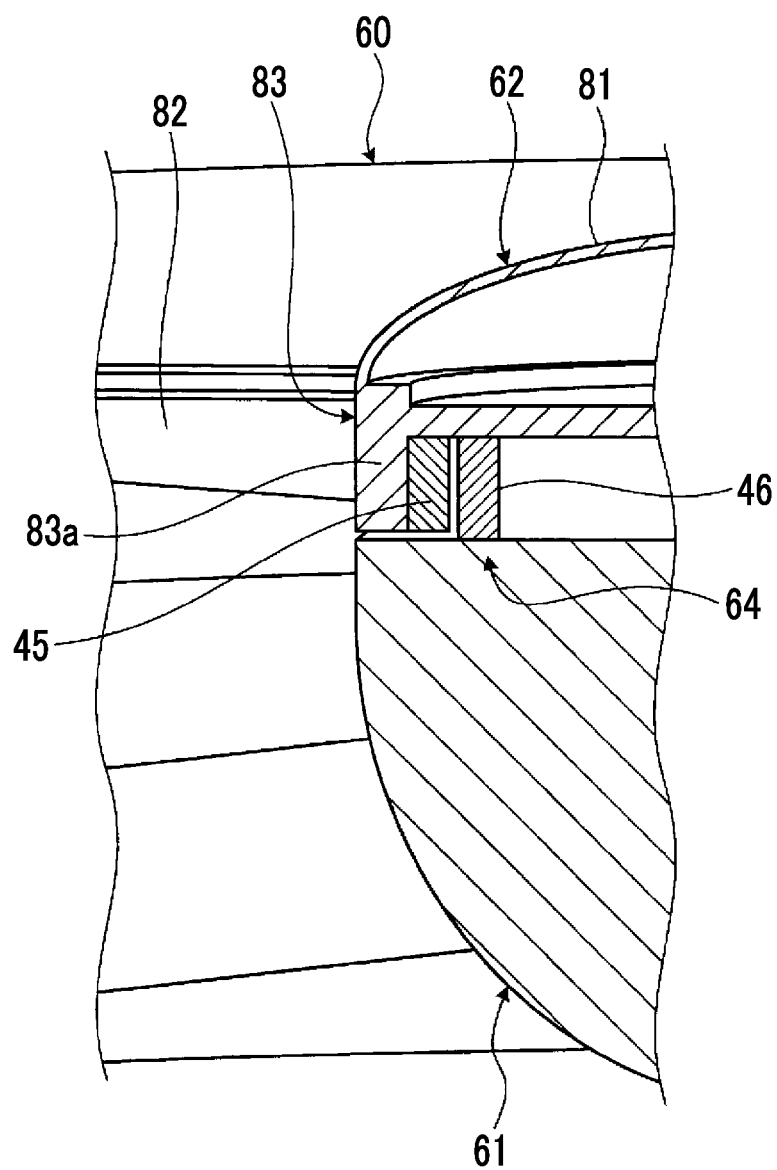
FIG. 6 is a partial cross-sectional view of a modification example of the motor-integrated fan according to the third embodiment.

Axial arrangement where the permanent magnets 45 and the coils 46 are arranged to face each other in the axial direction of the rotational axis I is made in the third embodiment, but a modification example shown in FIG. 6 may be made. FIG. 6 is a partial cross-sectional view of a modification example of the motor-integrated fan according to the third embodiment. Radial arrangement where the permanent magnets 45 and the coils 46 are arranged to face each other in the radial direction of the rotational axis I is made in the modification example shown in FIG. 6.

The permanent magnets 45 are provided to be held on the outer peripheral side of the inner ring portion 83c of the rotation support ring 83, and are arranged in an annular shape in the circumferential direction. The permanent magnets 45 are provided at positions facing the coils 46 in the radial direction of the rotational axis I.

A plurality of coils 46 are provided to be held in the shaft part 61, are provided to face the respective poles of the permanent magnets 45, and are arranged in the circumferential direction. The coils 46 are provided at positions facing the permanent magnets 45, which are held by the rotation part 62, in the radial direction of the rotational axis I. Radial arrangement where the permanent magnets 45 and the coils 46 are arranged to face each other in the radial direction of the rotational axis I as described above may be made.

Fourth Embodiment

Figure 7:
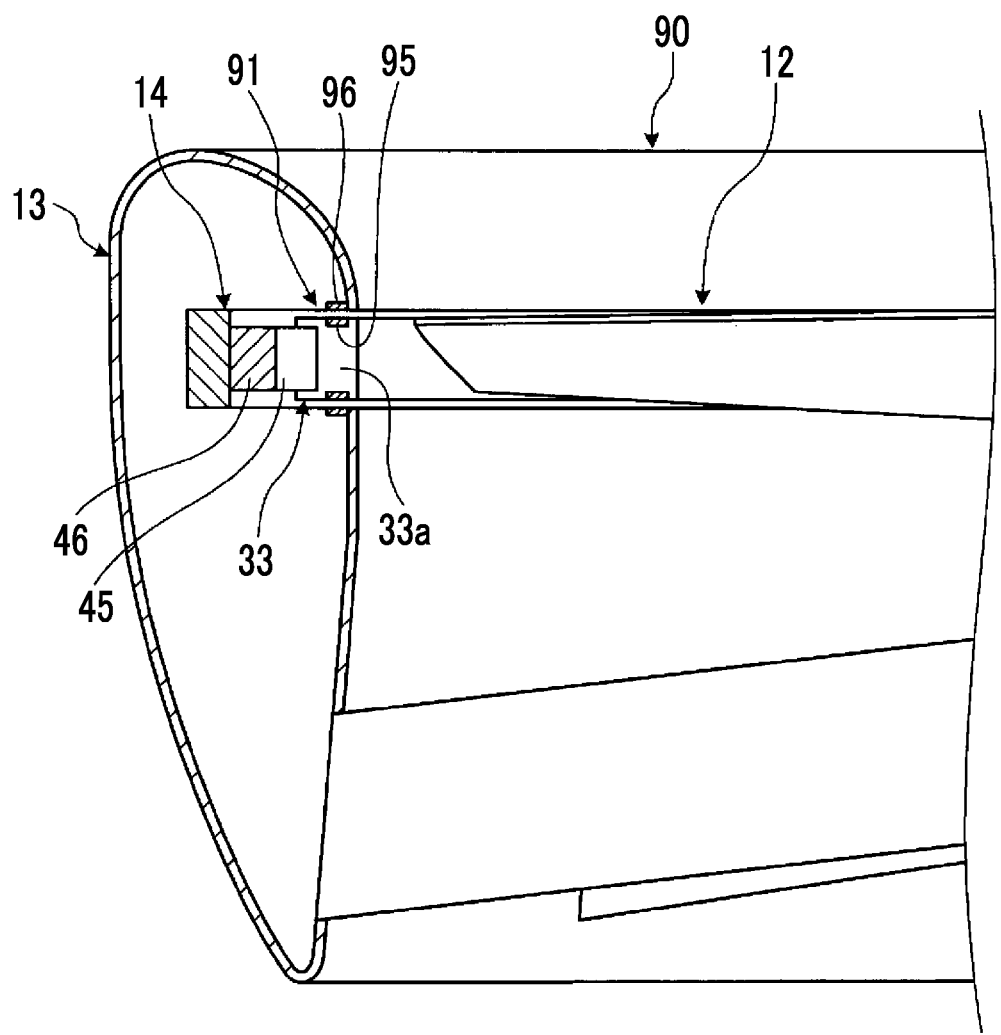
FIG. 7 is a cross-sectional view of a motor-integrated fan according to a fourth embodiment.

Next, a motor-integrated fan 90 according to a fourth embodiment will be described with reference to FIG. 7. Even in the fourth embodiment, in order to avoid repeated description, portions different from those of the first to third embodiments will be described and portions having the same configuration as the configuration of the first to third embodiments will be denoted by the same reference numerals as the reference numerals of the first to third embodiments and will be described. FIG. 7 is a cross-sectional view of the motor-integrated fan according to the fourth embodiment.

The motor-integrated fan 90 according to the fourth embodiment includes a magnetic bearing 91 instead of the rolling bearings 51 provided in the motor-integrated fan 50 according to the second embodiment.

The magnetic bearing 91 includes a pair of rotating-side magnets 95 that is provided on both sides of the inner ring portion 33a of the rotation support ring 33 in the axial direction, and a pair of fixed-side magnets 96 that is provided in the duct 13 so as to face the pair of rotating-side magnets 95. The rotating-side magnets 95 are permanent magnets and the fixed-side magnets 96 are coils. The rotating-side magnets 95 and the fixed-side magnets 96 are provided to face each other in the axial direction of the rotational axis I. Coils may be used as the rotating-side magnets 95 and permanent magnets may be used as the fixed-side magnets 96. In a case where the magnetic field of the magnetic bearing 91 is controlled so that the rotating-side magnets 95 and the fixed-side magnets 96 repel each other, the rotation support ring 33 is rotatably supported by the magnetic bearing 91 in a state where the rotation support ring 33 is not in contact with the duct 13.

Further, in a case where the magnetic bearing 91 is provided, the permanent magnets 45 of the motor 14 are provided on the outside of the inner ring portion 33a of the rotation support ring 33 in the radial direction and the coils 46 are provided in the duct 13 so as to face the permanent magnets 45 in the radial direction of the rotational axis.

According to the fourth embodiment, the rotation part 12 can be smoothly rotated in a state where the rotation part 12 and the duct 13 are not connected to each other as described above. For this reason, the transfer of a load, which is applied to the rotation part 12, to the duct 13 can be suppressed.

In the fourth embodiment, the magnetic bearing 91 is used instead of the rolling bearings 51 provided in the motor-integrated fan 50 according to the second embodiment. However, the magnetic bearing 91 may be used instead of the rolling bearing 15 provided in the motor-integrated fan 1 according to the first embodiment.

REFERENCE SIGNS LIST

1: motor-integrated fan
11: shaft part
12: rotation part
13: duct
14: motor
15: rolling bearing
16: rectification plate
17: aerodynamic device
20: control unit
31: hub
32: blade
33: rotation support ring
38: suction port
39: blow-out port
41: upstream portion
42: midstream portion
43: downstream portion
45: permanent magnet
46: coil
50: motor-integrated fan (second embodiment)
51: rolling bearing
60: motor-integrated fan (third embodiment)
61: shaft part
62: rotation part
63: duct
64: motor
65: rolling bearing
66: rectification plate
67: aerodynamic device
70: control unit
81: hub
82: blade
83: rotation support ring
90: motor-integrated fan (fourth embodiment)
91: magnetic bearing
95: rotating-side magnet
96: fixed-side magnet

The invention claimed is:

1. A motor-integrated fluid machine in which one or more motors are integrally provided, the motor-integrated fluid machine comprising:
a shaft part at a center of a rotational axis and serving as a first portion of a supporting system;
a rotation part to be rotated about the shaft part and serving as a rotating system;
an outer peripheral part on an outer periphery of the shaft part and serving as a second portion of the supporting system; and
a motor configured to rotate the rotation part,
wherein the rotation part is rotatably supported by at least the shaft part and is rotated by the motor, and the rotation part includes a plurality of blades arranged in a circumferential direction of the rotational axis and a rotation support member connected to one side of each of the plurality of blades in a radial direction of the rotational axis and supporting the plurality of blades,
wherein the outer peripheral part is a duct formed in an annular shape and configured to generate a thrust due to the rotation of the rotation part,
wherein the duct includes an upstream portion on an inflow side into which fluid flows, a downstream portion on an outflow side out of which the fluid flows, and a midstream portion between the upstream portion and the downstream portion,
wherein at least an inner peripheral surface of the upstream portion has a predetermined radius of curvature in a cross section taken along a plane orthogonal to the circumferential direction of the rotational axis,
wherein an inner peripheral surface of the midstream portion has a linear portion in the cross section,
wherein an inner peripheral surface of the downstream portion is tapered so as to spread radially from the inflow side toward a downstream side,
wherein an inflow side surface of the rotation part is perpendicular to the axial direction of the rotational axis and forms a plane of rotation, and a relationship between a diameter D of the plane of rotation and the predetermined radius of curvature r is $0.03D \leq r \leq 0.09D$,
wherein the inner peripheral surface of the downstream portion is linear in a cross-sectional view viewed from a direction perpendicular to the axial direction of the rotational axis,
wherein the inner peripheral surface of the downstream portion is tapered to form an angle between the inner peripheral surface of the downstream portion and a direction of the inner peripheral surface of the midstream portion in a range of 30° or less,
wherein the motor includes a rotor-side magnet on an outer peripheral side of the rotation support ring in the radial direction and a stator-side magnet on an inner peripheral side of the outer peripheral part and arranged to face the rotor-side magnet, and
wherein opposing surfaces of the rotor-side magnet and the stator-side magnet are perpendicular to the axial direction of the rotational axis.

2. The motor-integrated fluid machine according to claim 1,
wherein the motor is an outer periphery drive motor configured to supply power to the rotation part from the outer peripheral part to rotate the rotation part, and
wherein the rotation support member of the rotation part is a rotation support ring having an annular shape centered on the rotational axis and being connected to an outer peripheral side of the plurality of blades in the radial direction of the rotational axis.

3. The motor-integrated fluid machine according to claim 2, wherein the rotor-side magnet and the stator-side magnet face each other in an axial direction of the rotational axis.

4. The motor-integrated fluid machine according to claim 1, wherein the rotation part is on an inflow side of the shaft part into which fluid flows in an axial direction of the rotational axis.

5. The motor-integrated fluid machine according to claim 1, further comprising:
an aerodynamic device on an inner peripheral surface of the duct on an outflow side of the rotation part, the aerodynamic device being configured to suppress separation of fluid flowing along the inner peripheral surface,
wherein the aerodynamic device is on a boundary side of at least the midstream portion at a boundary between the midstream portion and the downstream portion.

6. The motor-integrated fluid machine according to claim 1, wherein an inflow-side plane formed by inflow-side end portions of the plurality of blades orthogonal to an axial direction of the rotational axis during the rotation of the plurality of blades is positioned at the midstream portion in the axial direction.

7. The motor-integrated fluid machine according to claim 1, further comprising a rectification plate on an outflow side of the rotation part, the rectification plate connecting the shaft part to the outer peripheral part, and being configured to recitify a flow of fluid flowing from the rotation part.

8. A vertical take-off and landing aircraft comprising:
the motor-integrated fluid machine according to claim 1; and
an airframe moved by a thrust generated from the motor-integrated fluid machine.

9. A motor-integrated fluid machine in which one or more motors are integrally provided, the motor-integrated fluid machine comprising:
a shaft part at a center of a rotational axis and serving as a first portion of a supporting system;
a rotation part to be rotated about the shaft part and serving as a rotating system;
an outer peripheral part on an outer periphery of the shaft part and serving as a second portion of the supporting system; and
a motor configured to rotate the rotation part,
wherein the rotation part is rotatably supported by at least the shaft part and is rotated by the motor, and the rotation part includes a plurality of blades arranged in a circumferential direction of the rotational axis and a rotation support member connected to one side of each of the plurality of blades in a radial direction of the rotational axis and supporting the plurality of blades,
wherein the outer peripheral part is a duct formed in an annular shape and configured to generate a thrust due to the rotation of the rotation part,
wherein the duct includes an upstream portion on an inflow side into which fluid flows, a downstream portion on an outflow side out of which the fluid flows, and a midstream portion between the upstream portion and the downstream portion,
wherein at least an inner peripheral surface of the upstream portion has a predetermined radius of curvature in a cross section taken along a plane orthogonal to the circumferential direction of the rotational axis,
wherein an inner peripheral surface of the midstream portion has a linear portion in the cross section,
wherein an inner peripheral surface of the downstream portion is tapered so as to spread radially from the inflow side toward a downstream side
wherein an inflow side surface of the rotation part is perpendicular to the axial direction of the rotational axis and forms a plane of rotation, and a relationship between a diameter D of the plane of rotation and the predetermined radius of curvature r is $0.03D \leq r \leq 0.09D$,
wherein the inner peripheral surface of the downstream portion is linear in a cross-sectional view viewed from a direction perpendicular to the axial direction of the rotational axis,
wherein the inner peripheral surface of the downstream portion is tapered to form an angle between the inner peripheral surface of the downstream portion and a direction of the inner peripheral surface of the midstream portion in a range of 30° or less,
wherein the motor-integrated fluid machine further comprises an aerodynamic device on an inner peripheral surface of the duct on an outflow side of the rotation part, the aerodynamic device being configured to suppress separation of fluid flowing along the inner peripheral surface,
wherein the aerodynamic device is on a boundary side of at least the midstream portion at a boundary between the midstream portion and the downstream portion,
wherein the motor-integrated fluid machine further comprises a control unit configured to control the aerodynamic device, and
wherein the control unit is configured to operate the aerodynamic device until the rotation part reaches a predetermined rotation speed.

* * * * *